Nov. 9, 1926.
D. D. MASTERS
1,606,090
CHAIN LOCK AND TIGHTENER
Filed Feb. 23, 1926
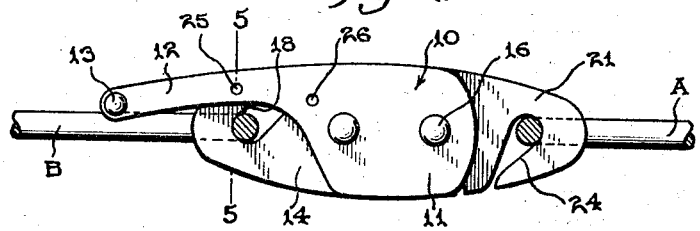
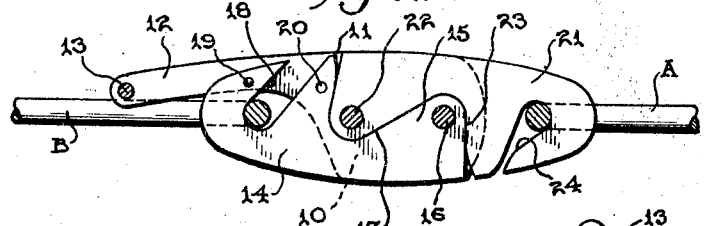
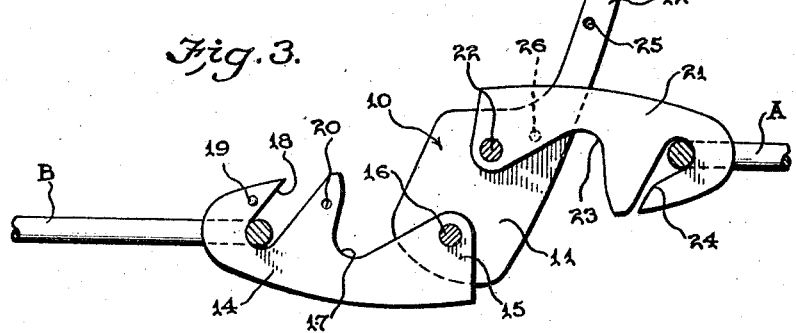
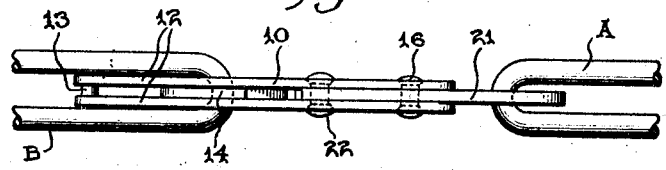
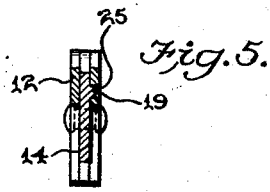
Inventor
David D. Masters
By Watson E. Coleman.
Attorney Patented Nov. 9, 1926.

1,606,090

UNITED STATES PATENT OFFICE.

DAVID D. MASTERS, OF BUFFALO, WYOMING.

CHAIN LOCK AND TIGHTENER.

Application filed February 23, 1926. Serial No. 90,124.

This invention relates to locking links such as are used for tire chains for the purpose of connecting the chains to each other and particularly to certain improvements upon the locking link and chain tightener shown in the patent to Masters and Brandt No. 1,546,096, granted July 14, 1925.

The general object of the present invention is to improve upon the construction illustrated in this patent by securing greater leverage, making the device practical and provide an easier means of application to chains.

A further object is to provide a device of this character which does not require a tool for the purpose of tightening up the chain and in which when the chain is tightened the device will be held from any reverse movement which would tend to release the chain, a fault which is very common in chain locks.

A still further object is to simplify the construction shown in my prior patent before referred to, and secure a more effective and positive locking device.

My invention is illustrated in the accompanying drawings wherein:—

Figure 1 is a side elevation of my chain locking device;

Fig. 2 is a longitudinal sectional view therethrough with one of the side plates of the lever removed;

Fig. 3 is an elevation showing the device in an expanded condition;

Fig. 4 is a top plan view of the construction shown in Figure 1;

Fig. 5 is a section on the line 5—5 of Figure 1.

Referring to these drawings it will be seen that the improved chain tightener comprises a lever, designated generally 10, which is provided with a relatively wide body portion 11 and the handle 12. This lever is formed of two plates of metal joined at the end of the lever as at 13. Adjacent the end of the body 11 remote from the end of the lever there is pivoted a link or chain engaging member 14. This is formed with a lug 15 disposed between the two plates constituting the lever and pivoted thereof by a rivet 16. This chain engagement member 14 is formed with the recess 17 and with the downwardly and outwardly inclined chain slot 18. Outward of this chain slot 18 the member 14 is formed with a slight projection 19 and the intermediate tongue formed between the chain slot 18 and the recess 17 is formed with a perforation 20. Disposed with its inner end between the two plates constituting the lever 10 is a second chain engaging member 21 which has approximately the same form as the first named member and is pivoted by means of a rivet 22. This chain engaging member has a recess 23 and the chain slot 24; this slot being initially open for the entrance of a chain A into the slot but after the link of the chain A is inserted, the bill of the hook formed by the slot 24 is nearly closed by pinching or any other suitable manner so that the chain A is more or less permanently attached to the member 21.

It will be noted from Figure 2 that the outer wall of the recess 14 is nearly straight while the rear wall is rearwardly inclined and the same is true of the walls of the recess 23. Therefore, when the two members 14 and 21 are brought into parallel relation as illustrated in Figure 2, the rear portion of the chain engaging member 21 will fit into the recess 17 and the rear portion of the chain engaging member 14 will fit into the recess 23, thus interlocking the two links (and the lever too) in a position where the points of application of the chain links to the device are directly opposite to each other so that the pull or strain on the locking device will not act to open the lock. As a further protection, however, I have formed the member 14 with a protuberance 19 and provided the handle 12 with an aperture 25 which when the lever is in the position shown in Figure 1, will register with the protuberance 19 and the side wall of the lever will spring over and into engagement with the protuberance, thus again locking the lever in such position that it is impossible to open the link.

It will be seen from Figure 2 that the rear end or inner end of the member 21 under these circumstances extends straight downward and that this member 21 cannot, therefore, be turned upon its pivot or swung upward upon its pivot without also forcing the chain engaging member 14 down or in reverse direction and that, therefore, the strain on the two members will be such as to hold them in their aligned position.

I have also provided an aperture 26 in the lever which is adapted to register with the aperture 21 so that a wire, pin or other locking device may be inserted through these aligning apertures to thereby additionally lock the parts in their aligned position.

It will be seen that with this construction the parts may be turned to the full line position in Figure 3 to thereby extend the locking device to its full length and the hook slot 18 may then be engaged with the chain. The lever 10 may then be thrown over to the position shown in Figure 1 which draws the two links into overlapping relation to each other and when the lever is entirely closed the links will be disposed in full interlocked overlapping relation and held from any change of position under strain.

With this device no tool is necessary in order to draw the chains toward each other and a relatively great leverage is secured. With this construction also, the chain A cannot become detached from the member 21 because of the closed hook and the chain B cannot be detached from the chain slot 18 because of the fact that the handle of the lever extends across this chain slot positively holding the chain B in place, so that even if the chain slackens and flaps it cannot disengage itself from the locking device. This is particularly necessary inasmuch as a chain, no matter how tight it is to start with, will while in motion on the wheel, work itself loose and become disengaged from an open hook.

It will further be noted that in my device the chain is at its utmost tension when the lever has been tightened and that there is no slackening up of the chain when the lever is shifted into its fully closed position.

I claim:—

1. A chain locking and tightening device comprising a lever having a body and a handle, oppositely disposed chain engaging members pivoted to the lever at separated points whereby as the lever is brought into parallel relation with one of said members, the members will be drawn toward each other, the extremities of the members being formed for engagement with the ends of the chain and the inner edge faces of said members between the pivotal points, and the extremities thereof being each recessed to receive the pivotal extremity of the opposed chain engaging member and interlock therewith.

2. A chain locking and tightening device comprising a lever formed of two parallel spaced plates connected to each other for unitary movement, the lever comprising a body portion and a relatively long handle portion, oppositely disposed chain engaging members having their inner portions disposed between the two plates of the lever and pivoted to the lever at longitudinally spaced points whereby as the lever is brought into parallelism with one of said members the members will be drawn toward each other into overlapping relation, each of said members being formed with a recess on its inner edge face adapted to receive and interlocking with the pivotal end of the other of said members, each of said members being formed at its free extremity with means for engaging a link of a chain, one of said members having a lateral protuberance and the lever having a recess into which the protuberance is adapted to snap when the lever is brought into parallel relation to said member.

3. A chain locking and tightening device, comprising a lever having a body and a handle, oppositely disposed chain engaging members each pivoted at its inner end to the lever at separated points whereby as the lever is brought into parallel relation with one of said members, the members will be drawn toward each other, one of said members which is pivoted to the lever nearest the handle end thereof having a chain receiving opening, the other of the said members at its free end having an inclined slot, each of said members between the pivot thereof and the slot or opening being recessed, a protuberant portion of the edge face of one member fitting in the complementary recess of the other member, the handle portion of the lever, when the said members are in interfitting relation, extending across said slot and means for detachably holding said lever in the last named position.

In testimony whereof I hereunto affix my signature.

DAVID D. MASTERS.